Feb. 23, 1937.    P. R. MARTIN    2,071,417
TREATMENT OF CALCIUM MAGNESIUM CHLORIDE
Filed Feb. 23, 1935
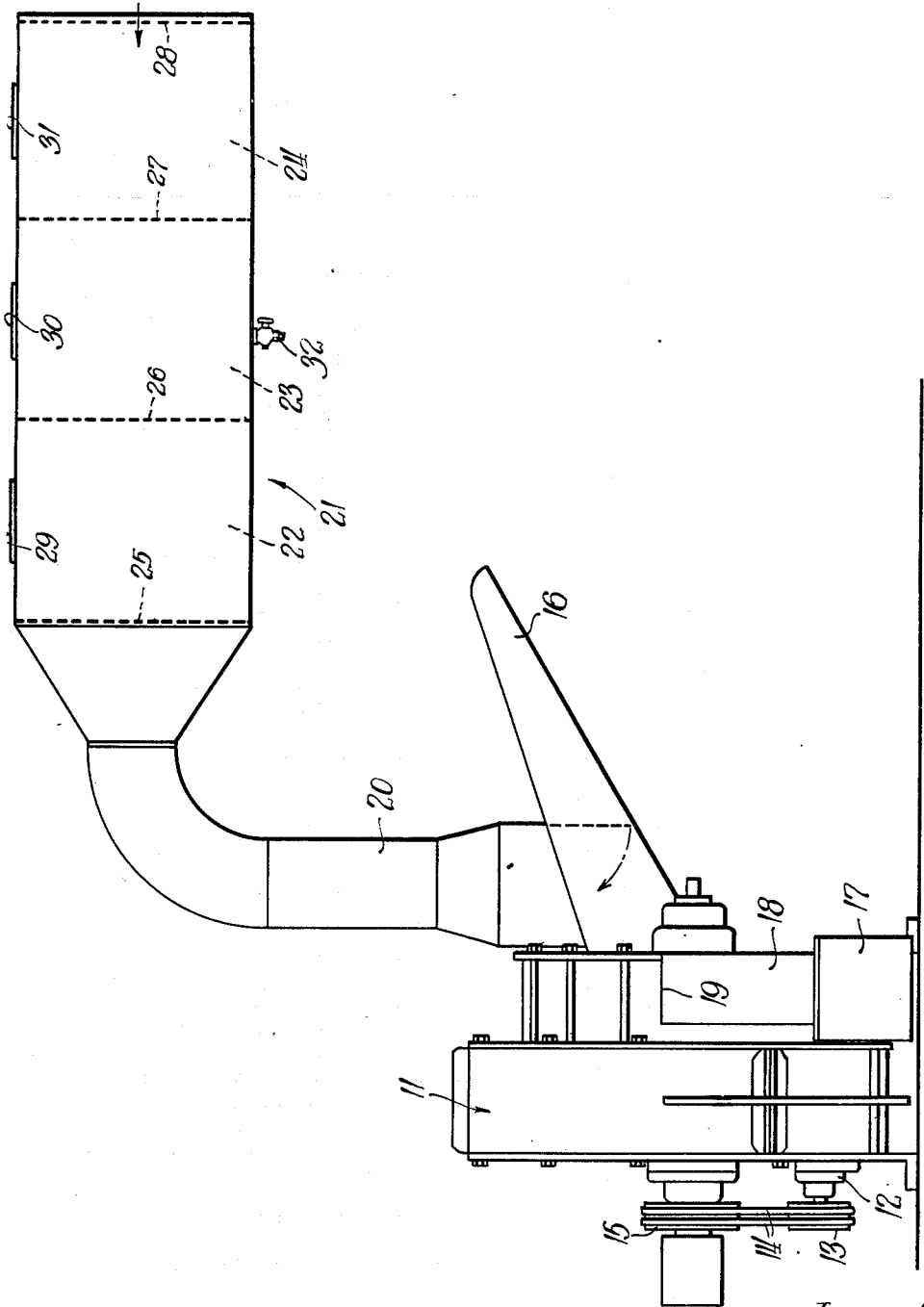
Inventor:
Peter R. Martin
By John J. McLaughlin
Atty.

Patented Feb. 23, 1937

2,071,417

UNITED STATES PATENT OFFICE 2,071,417

TREATMENT OF CALCIUM MAGNESIUM CHLORIDE

Peter R. Martin, Chicago, Ill., assignor to Fuel Treating Products Co., Chicago, Ill.

Application February 23, 1935, Serial No. 7,708

7 Claims. (Cl. 83—94)

This invention relates to the treatment of materials and is particularly concerned with a novel method and with apparatus for reducing deliquescent materials to a pulverulent condition. The invention is adapted for treating various materials of this character and is specifically applicable in the case of calcium magnesium chloride and the like.

The object of my invention and the manner in which it may be realized in practice will be better understood from a brief discussion of the factors that prompted its development, particularly with reference to the current methods of recovering and processing calcium magnesium chloride and its by-products.

The raw material for obtaining these substances is recovered from natural deposits according to suitable mining methods. The material is dissolved in water and the brine is processed for the removal of sodium chloride. Other valuble products such as bromine are also obtained by suitable reducing processes, leaving finally a sludge-like substance which consists principally of calcium magnesium chloride. This material is valuable in many instances on account of its hygroscopic properties, but its recovery and processing present serious problems.

One of the principal methods used at the present time for recovering and processing calcium magnesium chloride for shipping and for use includes the following steps: The residual sludge remaining after the recovery of sodium chloride, bromine and other by-products, is heated for a considerable time to about 350° F. in order to abstract water. The liquid is then poured into drums, allowed to cool and more hot liquid is added to take care of the shrinkage during the cooling. The material thus collected in the drums solidifies gradually in a natural process extending over more or less prolonged periods of time, in some cases several weeks, depending upon weather conditions. It is then sufficiently solid for further treatment to suit it for commercial purposes. The drums are broken away around the solid product prior to using it industrially and the product is broken up manually by means of suitable tools. The resulting relatively large pieces are then reduced to lumps varying in size from one-quarter inch to two inches and larger.

The above-described process is rather expensive and clumsy. It consumes a great deal of time and is generally objectionable. The final product is furnished in a form which needs further processing and is delivered in drums in rigidly determined relatively large quantities which tend to limit the use of the material to a few specific purposes. It is desirable that the material be furnished in pulverized form, in suitable containers or bags, ready for use, in any desired quantities. However, when it is attempted to reduce the material to pulverulent form by the use of grinding apparatus, it will be found that the hygroscopic nature of the substance introduces considerable difficulties. The material deliquesces rapidly during the process of grinding and clogs the mill, necessitating frequent interruptions for cleaning and drying the grinder and associated equipment.

Prior suggestions for overcoming these difficulties were not successful. The suggestion was made, for example, to feed heated air to the grinding mill, presumably on the ground of the reasoning that heated air would prevent deliquescence of the calicium magnesium chloride, or at least that it would largely eliminate the common troubles and lengthen the effective operating periods. These expectations were not realized and I have discovered that the reason for the failure resides in the fact that the deliquescence of the material does not depend upon the relative temperature of the intake air but upon the relative humidity of the atmosphere in which the grinding is accomplished. I have found that the deliquescent material, in the present case the calcium magnesium chloride, absorbs moisture from hot air as readily as from air of moderate or even low temperature. The reverse procedure, i. e., grinding under very low temperatures was also suggested and likewise failed for the same reasons pointed out in connection with the suggestion to employ heated air. In any case, after these suggestions and abortive attempts to carry them out the problem remained unsolved.

There are, therefore, two distinct principal problems involved in the recovery and processing of deliquescent materials such as calcium magnesium chloride, namely, first the problem of efficiently treating the raw material so as to recover it in substantially dry, conveniently comminuted form in a minimum time and at the least expense and trouble, and second, the problem of facilitating the final grinding of the product whenever it is desired to furnish it in dry, pulverulent condition.

I have found a solution for the first problem and have disclosed it in my co-pending application, Serial No. 755,746, filed December 3, 1934. It consists of a method and apparatus for recovering the hot liquid sludge-like substance, progressively cooling the same on a moving endless belt in order to solidify it quickly and discharging the solidified substance in lumps or chips of convenient size. The orthodox time-wasting storage in drums and the destruction of the drums and subsequent breaking up of the large solid bodies by crude manual labor is thereby avoided.

A solution for the second problem, namely, facilitating the grinding of the material in a mill by preventing its deliquescence is disclosed in the present specification. Briefly stated, I feed humidity-conditioned air to the mill and I condition the air by subjecting it preparatory to the entrance into the grinding mill to the action of the hygroscopic deliquescent material in order to abstract moisture therefrom. In other words, I take advantage of the highly hygroscopic nature of the substance which I desire to reduce to pulverulent form and use part of the substance for removing moisture from the air fed into the grinding apparatus. No absorption of moisture sufficient to cause deliquescence of the material, or clogging of the mill can therefore occur within the grinding mill itself and I am enabled to make use of a continuous grinding process without any interruptions and to furnish the calcium magnesium chloride in pulverulent form efficiently, continuously and cheaply.

Other objects and features of the invention will appear from the following detailed description referring to the accompanying drawing, which illustrates a simple embodiment of the apparatus that may be employed in practicing my invention.

The apparatus may comprise a grinding mill of suitable known construction having a housing 11 in which are disposed the breaking and crushing elements designed to break the material into particles of suitable substantially uniform size. These crushing elements may consist of revolving hammers, knives or breaker bars or the like, according to the particular design and principle employed in the construction of such apparatus.
A motor 12 may be secured to or placed near the housing 11 as desired for transmitting power to the apparatus by means of a pulley 13 and a chain or belt drive 14 actuating the pulley 15. The latter may be disposed on the main shaft of the machine to operate the crushing elements contained within the housing. Any suitable grinding mill may of course be used.

The material may be fed into the mill by means of the inclined trough or runway 16, which may be conveniently disposed at or near the discharge end of the cooling and solidifying apparatus shown in the previously noted co-pending application. It will be understood, therefore, that the present invention is in a sense a further development of the prior disclosure and embraces the previously disclosed concept of recovering the material and solidifying it, as well as the concept of feeding the solidified material into a grinding mill and processing it further according to the present disclosure so as to deliver the material in dry, solid, pulverulent condition.

A suitable fan or other apparatus producing a movement of air may be disposed within the extension housing 17 and may be operated either independently or from the motor 12 as desired. Numeral 18 designates a funnel having an open exit at the line designated by numeral 19. Secured to this funnel may be a tubular extension for conducting the pulverulent material to a suitable bin or the like where the same may be bagged or put into containers ready for shipping and ready for use. The discharge of the material in the apparatus shown is of course in an upward direction, but the tubular extension attached to the open end 19 of the funnel 18, may be constructed in any convenient form and may direct the discharge to any desirable and convenient point.

The apparatus described so far may correspond substantially to well-known machinery which is available on the market. This machinery also includes a tubular conduit 20 for feeding air into the grinding mill. It is understood, of course, that the air is forced or drawn into the mill by the action of the previously mentioned fan or by the air moving action of the grinding or pulverizing elements themselves contained in the housing, and the finely ground material is expelled with the air through the tubular discharge funnel 18. The use of unconditioned air led to difficulties mentioned previously. The use of temperature conditioned air, as suggested in the past, does not produce and beneficial results because, as I have stated before, the deliquescence of the calcium magnesium chloride during the grinding process within the mill does not depend upon the relative temperature of the atmospheric medium but rather on its relative humidity.

Referring now again to the drawing, it will be seen that I have secured to the air intake funnel 20 an air conditioning housing generally designated by the numeral 21. This housing may be provided with several serially related compartments or cells such as indicated by the reference numerals 22, 23, and 24. These compartments are separated by screens 25, 26, and 27. A screen 28 may be used for closing the end of the housing 21 where the air enters in the direction indicated by the arrow. Suitable lids or panels 29, 30, and 31 may be provided for gaining access to the individual compartments 22, 23, and 24, respectively. A common drain 32, which may be closed by a suitable valve, is provided at the bottom of the housing 21. I dispose within this housing 21 and within the various compartments thereof suitable quantities of solidified calcium magnesium chloride for the purpose of removing moisture from the air forced into the grinding mill during the process of grinding the material fed to the mill by means of the runway 16. The air enters the housing 21 through the screen 28 in the direction of the arrow and then contacts the deliquescent calcium magnesium chloride disposed in the compartment 24, whereupon the air enters the compartment 23 through the screen 27 and again contacts the calcium magnesium chloride contained in the compartment 23. The air then progressively advances through the screen 26 into the compartment 22 where it is again subjected to the action of the calcium magnesium chloride disposed in compartment 22. It will thus be seen that the intake air advances progressively through the various compartments, all containing amounts of the highly deliquescent calcium magnesium chloride. Moisture is thus removed from the intake air and dry air finally enters the intake funnel 20 through the screen 25 and is then conducted into the grinding mill. The calcium magnesium chloride entering the grinding mill is itself subjected to humidity-conditioned air from which all moisture has been removed. Deliquescing of the calcium magnesium chloride within the mill during the process of grinding is therefore effectively prevented.

It is understood, of course, that the size of the conditioning housing 21 will be determined by the capacity of the grinding mill and by the quantity of air to be conditioned within a pre-determined time. Humidity control means, including indicating instruments, may be provided if desired. Any desirable and necessary number of compartments may be provided and they may be disposed in serial relation or parallel. Provision for conditioning the temperature of the air may be added if desired. The calcium magnesium chloride disposed within the conditioning housing 21 and the various compartments thereof deliquesces due to abstracting the moisture from the intake air and the resulting liquid may be drained off by means of the drain 32 whenever necessary and may be conducted to the recovery apparatus described in the previously mentioned co-pending application, and again solidified. The removal of moisture from the intake air is therefore accomplished substantially without loss of material since the liquid drained from the conditioning housing 21 will again be converted into solid calcium magnesium chloride by the method and apparatus shown in the co-pending application. Structural as well as functional changes and modifications may be made if desired, or if called for in specific cases, but I want to have it understood that all such changes and modifications are to be considered within the limits of my invention provided that they fall within the scope and the meaning of the appended claims.

What I claim as new and desire to protect by Letters Patent of the United States is:

1. The process of treating solid deliquescent material to reduce the particle size thereof which comprises grinding said material in an atmosphere from which the moisture has been removed by contact of said atmosphere with a part of said deliquescent material.

2. The process of treating solid deliquescent material to reduce the particle size thereof which comprises dehydrating air, passing said air into contact with said deliquescent material, and grinding said material in the presence of said dehydrated air.

3. The process of treating solid deliquescent material to reduce the particle size thereof which comprises dehydrating air by contacting it with a deliquescent material, passing said air into contact with said solid deliquescent material, and grinding the material to be treated in the presence of said dehydrated air.

4. The process of pulverizing solid deliquescent material which comprises removing moisture from a stream of air by contacting it with deliquescent material, then forcing said moisture-free air through a grinding apparatus and in contact with the first mentioned deliquescent material disposed therein, and grinding said first mentioned deliquescent material while forcing the moisture-free air through said grinding apparatus.

5. The process of claim 4 wherein the removal of moisture from the air is effected by progressively subjecting said air to successive contact with physically separated portions of the deliquescent material.

6. The process of claim 1 wherein the solid deliquescent material is calcium magnesium chloride.

7. The process of claim 3 wherein the solid deliquescent material to be reduced is calcium magnesium chloride.

PETER R. MARTIN.